United States Patent

[11] 3,547,349

| [72] | Inventor | Hans Justus Meier<br>Bremen, Germany |
|---|---|---|
| [21] | Appl. No. | 726,510 |
| [22] | Filed | May 3, 1968 |
| [45] | Patented | Dec. 15, 1970 |
| [73] | Assignee | Vereinigte Flugtechnische Werke G.m.b.H.<br>Bremen, Germany |

[54] VERTICALLY STARTING AND LANDING AIRPLANE WITH A TWO-FLOW JET DRIVE WITH LATERALLY TILTABLE NOZZLES
3 Claims, 4 Drawing Figs.

| [52] | U.S. Cl. | 239/265.35 |
| [51] | Int. Cl. | B64c 15/04 |
| [50] | Field of Search | 239/265.11, 265.43 |

[56] References Cited
FOREIGN PATENTS

| 960,398 | 6/1964 | Great Britain | 239/265.35 |
| 1,019,303 | 2/1966 | Great Britain | 60/232 |

*Primary Examiner*—Lloyd L. King
*Attorney*—Walter Becker

ABSTRACT: A vertically starting and landing airplane with a two-flow jet drive, which includes cold jet flow discharging nozzle means and hot jet flow discharging nozzle means spaced from said cold flow discharging nozzle means in the longitudinal direction of said airplane while said hot jet flow nozzle means are pivotable and located at the rear portion of the jet drive, means being provided for heating up the cold jet flow, and additional means are associated with said cold jet flow discharging nozzle means for displacing the discharge of the heated up cold jet flow toward the rear of said jet drive.

PATENTED DEC 15 1970
3,547,349
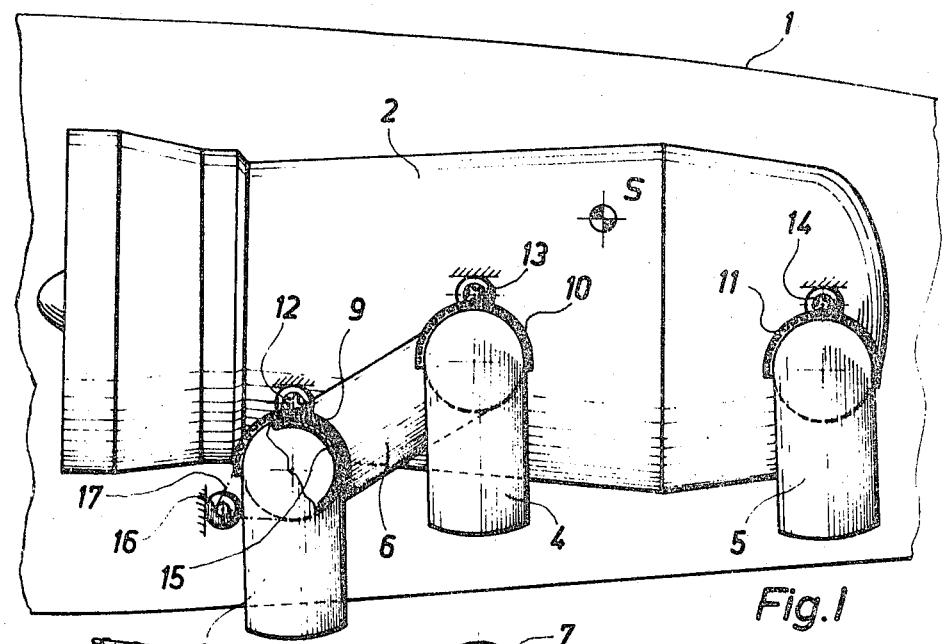
Fig.1
Fig.1a
Fig.2a
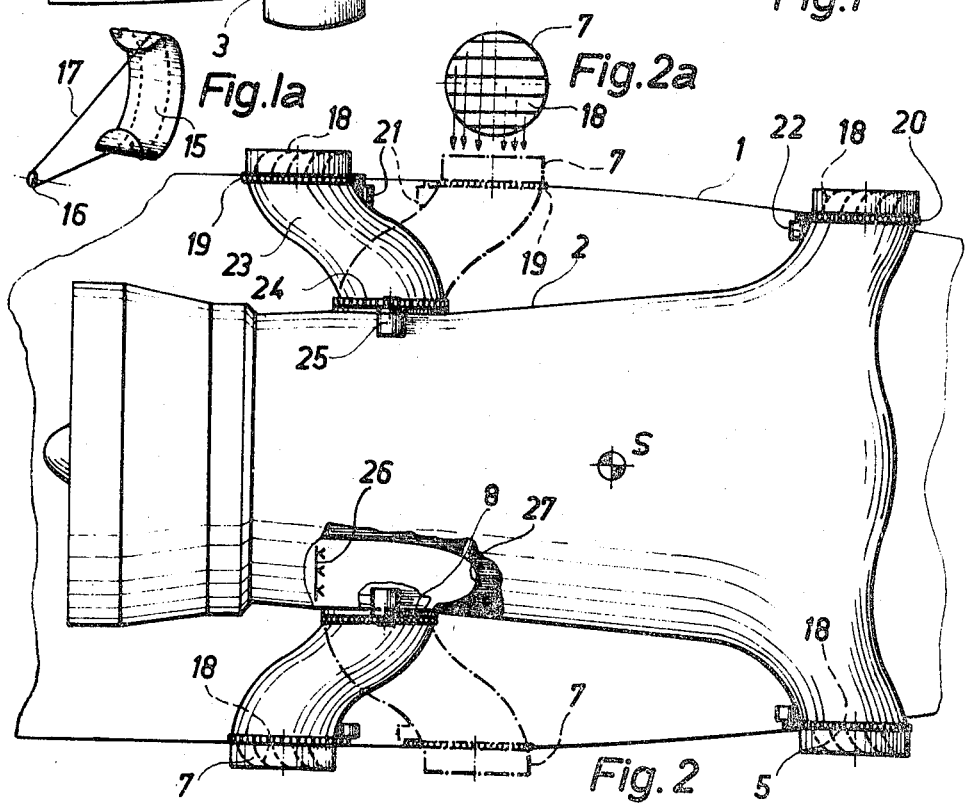
Fig.2
Inventor:
Hans Justus Meier
By

VERTICALLY STARTING AND LANDING AIRPLANE WITH A TWO-FLOW JET DRIVE WITH LATERALLY TILTABLE NOZZLES

The present invention relates to a vertically starting and landing airplane with a two-flow jet drive the thrust jets of which are conveyed through tiltable nozzles arranged laterally on the fuselage.

Vertically starting and landing airplanes are known which are equipped with a two-flow jet drive with tiltable nozzles on both sides of the fuselage. With airplanes of this type, the resulting thrust vector may pass through or in the vicinity of the center of gravity of the airplane in order to obtain moment equilibrium. A selective heating up of the cold jet in vertical flight or during hovering flight for purposes of increasing the thrust, would cause the resulting thrust vector to move outwardly to an inadmissable extent.

It is, therefore, an object of the present invention to provide a vertically starting and landing airplane with a two-flow jet drive which will overcome the above-mentioned drawbacks.

It is another object of this invention to provide an aircraft of the above-mentioned type with means which will assure that moment equilibrium will be established for any loading and flying condition.

These and other objects and advantages of the invention will appear more clearly from the following specification in connection with the accompanying drawings, in which:

FIG. 1 shows an arrangement according to the present invention with a pair of tiltable nozzles interposed between the cold and hot nozzles;

FIG. 1a illustrates a control valve for use in connection with the arrangement of FIG. 1;

FIG. 2 diagrammatically illustrates a modification of the arrangement according to the invention in which the tiltable nozzles for the cold flow are mounted at the ends of tubular arms which in their turn are tiltable about transverse axes; and FIG. 2a illustrates an end view of a tiltable nozzle.

The present invention, which concerns a vertically starting and landing aircraft with a two-flow jet drive in which the heatable cold flow leaves the jet engine through laterally tilting nozzles at the front while the hot gases are discharged through lateral tiltable nozzles at the rear, is characterized primarily in that when the heating of the cold flow is effected, the discharge of said flow is displaced toward the rear.

Referring now to the drawing and FIG. 1 thereof in particular, it will be noted that in the fuselage of an airplane 1, within the area of the center of gravity S of the airplane there is provided a two-flow jet drive 2 with tiltable nozzle pairs 3, 4 and 5. The hot jets leave the end of the drive 2 through tiltable nozzle pairs 5, whereas the tiltable nozzle pair 3 is intended for the cold jets. The intermediate tiltable nozzle pair 4 communicates with the front tiltable nozzle pair 3 through connecting lines 6. In normal condition, a control device closes the connecting lines 6 and the total of the cold jets in discharged through the front tiltable nozzle pair 3. Such control device may be of any suitable or standard structure, e.g. of the design shown in FIG. 1a comprising the valve member 15, a control motor 16, and a control chain 17. When the cold jet is to be heated up, to which end the connecting lines 6 are provided, the control device opens up the connecting lines 6 and closes the feeding lines to the front tiltable nozzle pair 3. The heating may be effected by any suitable or standard device, e.g. a flame holder 26 (FIG. 2) for heating the cold jet, and a plenum chamber 27 behind said holder 26. The heated jet now is discharged through the intermediate tiltable nozzle pair 4.

In order to prevent the jets from the front tiltable nozzle pair 3 during cruising, from hitting upon the intermediate tiltable nozzles 4, the latter are located somewhat higher than the tiltable nozzles 3.

As will be seen from FIG. 1, the tiltable nozzle pairs 3, 4, 5 are respectively provided with gear segments 9, 10, 11 respectively meshing with pinions on the motor shaft of control motors 12, 13, 14 adapted when actuated to adjust said nozzle pairs 3, 4, 5.

Referring now to the arrangement of FIG. 2, it will be noted that the tiltable nozzles 7 are journaled at the ends of tubular arms 23 of S-form which are tiltable about bearings 8, e.g. similar to the nozzle pairs of FIG. 1, namely, by gear segments 24 and motors 25. The solid-line condition of the tiltable nozzle 7 shown in FIG. 2 represents the condition in which the tiltable nozzles are adjusted toward the front. When heating up the jets, the said tiltable nozzle nozzles are displaced to their rear position, indicated by dot-dash lines. The nozzles are preferably equipped with deviating blades 18 which can be adjusted in conformity with the desired direction of thrust, e.g. by gear 19, 20 and pinions on the motor shafts of motors 21, 22, respectively.

In this way, it is possible to establish moment equilibrium for each loading and flying condition and also selectively to heat up the cold jet whereby during vertical and hovering flight a higher thrust will be produced or, if desired, smaller drives may be employed.

It is, of course, to be understood, that the present invention is, by no means, limited to the particular embodiments shown in the drawings, but also comprises any modifications within the scope of the disclosure.

I claim:

1. A vertically starting and landing airplane with a two-flow jet drive, which includes: cold jet flow discharging nozzle means, hot jet flow discharging nozzle means spaced from said cold flow discharging nozzle means in the longitudinal direction of said airplane, said hot jet flow nozzle means being pivotable and located at the rear portion of said jet drive, means for heating up the cold jet flow, means associated with said cold jet flow discharging nozzle means for displacing the discharge of the thus heated up cold jet flow toward the rear of said jet drive, an additional pair of pivotable nozzle means interposed between said cold and hot jet flow discharging nozzle means, and controllable means for selectively establishing connection between said additional pair of pivotable nozzle means to said cold flow discharging nozzle means.

2. A vertically starting and landing airplane with a two-flow jet drive, which includes: cold jet flow discharging nozzle means comprising S-formed pipe means pivotable about an axis transverse to the longitudinal flight direction of said jet drive and ahead of the center of gravity, hot jet flow discharge discharging nozzle means spaced from said cold flow discharging nozzle means hot jet flow nozzle in the longitudinal flight direction of said airplane, said hot jet flow nozzle means being pivotable and located near center of gravity in flight direction at the rear portion of said jet drive, means for heating up the cold jet flow, and means associated with said cold jet flow discharging nozzle means for displacing the thrust-resulting discharge of the thus heated up cold jet flow nearer the center of gravity location in flight direction toward the rear of said jet drive, the outer ends of said pipe means being provided with adjustable deviating blade means.

3. An airplane according to claim 2, in which said pipe means when pivoted out of the front into a rear position during vertically downwardly directed discharge represent a shortened effective lever arm for change in conjunction with thrust resulting from both forward streams being shifted rearwardly in a direction toward the center of gravity such that balance of moments of the airplane with respect to transverse axis thereof is maintained upon heating up of the cold jet flow.